(12) United States Patent
Rogan et al.

(10) Patent No.: US 12,622,464 B2
(45) Date of Patent: May 12, 2026

(54) ELECTRONIC CIGARETTE DEVICE WITH TEMPERATURE-ACTIVATED BATTERY VENT PORT

(71) Applicant: JT International SA, Geneva (CH)

(72) Inventors: Andrew Robert John Rogan, Forres (GB); Alec Wright, Guildford (GB)

(73) Assignee: JT International SA, Geneva (CH)

( * ) Notice: Subject to any disclaimer, the term of this patent is extended or adjusted under 35 U.S.C. 154(b) by 467 days.

(21) Appl. No.: 18/019,937

(22) PCT Filed: Jul. 16, 2021

(86) PCT No.: PCT/EP2021/069968
§ 371 (c)(1),
(2) Date: Feb. 6, 2023

(87) PCT Pub. No.: WO2022/028857
PCT Pub. Date: Feb. 10, 2022

(65) Prior Publication Data
US 2023/0284703 A1 Sep. 14, 2023

(30) Foreign Application Priority Data
Aug. 7, 2020 (EP) ..................................... 20190033

(51) Int. Cl.
*A24F 40/485* (2020.01)
*A24F 40/53* (2020.01)
*F16K 31/00* (2006.01)

(52) U.S. Cl.
CPC ............ *A24F 40/485* (2020.01); *A24F 40/53* (2020.01); *F16K 31/002* (2013.01)

(58) Field of Classification Search
CPC ............ A24F 40/53; H01M 2200/101; H01M 2/1235; H01M 8/0276; F16K 31/00; F16K 99/0038; F16K 17/38; F16K 31/002
See application file for complete search history.

(56) References Cited

U.S. PATENT DOCUMENTS 5,800,939 A * 9/1998 Mishina et al. ........ H01M 2/12
429/57
7,607,402 B2 10/2009 Petrakis
(Continued)

FOREIGN PATENT DOCUMENTS

CN 1747198 A 3/2006
CN 107432498 A 12/2017
(Continued)

OTHER PUBLICATIONS

CN107432498A_Espacenet Machine Translation (Year: 2025).*
(Continued)

*Primary Examiner* — Michael H. Wilson
*Assistant Examiner* — Ronnie Kirby Jordan
(74) *Attorney, Agent, or Firm* — Lerner David LLP

(57) ABSTRACT
An e-cigarette device includes a housing configured to hold a battery, a vent port arranged in the housing, and a safety valve means arranged on the vent port, wherein the safety valve means is configured to open and/or close the vent port partially and/or completely depending on the temperature within the housing. As the vent port opens automatically when the temperature of the battery exceeds a certain value, the potential danger of an explosion caused by an increase of pressure inside the housing due to a malfunction of the battery can be avoided.

20 Claims, 3 Drawing Sheets

(56) References Cited

U.S. PATENT DOCUMENTS

| | | | |
|---|---|---|---|
| 9,231,237 B2 | 1/2016 | Shimizu et al. | |
| 2006/0073375 A1 | 4/2006 | Hong et al. | |
| 2012/0263982 A1 | 10/2012 | Yasui et al. | |
| 2017/0188632 A1 | 7/2017 | Hon | |
| 2020/0365858 A1* | 11/2020 | Jaspers et al. | F16K 17/403 |
| 2021/0015163 A1* | 1/2021 | Mizuguchi et al. | A24F 40/53 |

FOREIGN PATENT DOCUMENTS

| | | | |
|---|---|---|---|
| CN | 108091805 A | 5/2018 | |
| CN | 210726707 U | 6/2020 | |
| JP | S57100678 U | 6/1982 | |
| JP | S59080583 A | 5/1984 | |
| JP | H08064234 A | 3/1996 | |
| JP | 2019106307 A | 6/2019 | |
| JP | 6682031 B1 | 4/2020 | |
| JP | 2021016307 A | 2/2021 | |
| WO | 2012073438 A1 | 6/2012 | |

OTHER PUBLICATIONS

International Search Report for PCT/EP2021/069968 mailed Nov. 9, 2021. 3 pages.
Search Report dated Oct. 20, 2025 from the Office Action for Chinese Application No. 202180057855.6 issued Oct. 29, 2025, pp. 1-2.

* cited by examiner 16 18 20a 22a 22b 20b 16 18 22a 20a 20b 22b

ELECTRONIC CIGARETTE DEVICE WITH TEMPERATURE-ACTIVATED BATTERY VENT PORT

CROSS-REFERENCE TO RELATED APPLICATIONS

The present application is a national phase entry under 35 U.S.C. § 371 of International Application No. PCT/EP2021/069968, filed on Jul. 16, 2021, published in English, which claims priority from European Application No. 20190033.9, filed on Aug. 7, 2020, the disclosures of which are incorporated herein by reference.

TECHNICAL FIELD

The invention relates to an electronic cigarette device.

TECHNICAL BACKGROUND

In recent years, there is a tendency among consumers to replace conventional cigarettes by electronic cigarette devices, which are essentially used in a manner similar to that of conventional cigarettes. In particular, a cartomizer at a first end of the device is contacted by the lips in order to inhale the aerosol.

Such devices are usually powered by a battery installed inside the housing. To protect the battery from external influences like dirt, dust or humidity, the housing should be hermetically sealed from the outside.

However, in some rare cases, it has happened that the battery overheats and emits high pressure gases, which can result in an explosion if the pressure inside the housing cannot be released. Therefore, in order to improve the safety of the device, means to relieve such pressure should be provided.

A battery pack for e-cigarettes with a safety valve for pressure relief in case of a malfunction of the battery is for example disclosed in CN 107 432 498. As the safety valve opens only when the pressure inside the battery pack increases, there is still a danger of explosion in case the pressure builds up very quickly.

A battery monitoring and protection system that is not applied to e-cigarettes and features, inter alia, a safety exhaust valve with a shape memory alloy (SMA) sheet is disclosed in CN 108 091 805. As long as the temperature is below a certain value, the SMA sheet blocks the vent hole. When it exceeds said value, the SMA sheet deforms and opens the vent hole. A battery cell module with a similar safety valve is disclosed in U.S. Pat. No. 9,231,237 B2.

The use of SMAs in a large variety of applications is disclosed in U.S. Pat. No. 7,607,402 B2, inter alia for creating a path through a shell wall of a drug delivery device in order to release a substance into the human body.

SUMMARY OF THE INVENTION

In view of the above, it is an object underlying the invention to provide an electronic cigarette device with a sealed battery compartment and means to securely relief the pressure in case the battery overheats ("thermal event").

This object is solved by means of the subject-matter of claim 1. Preferred embodiments are described in the further claims.

Accordingly, the invention refers to an electronic cigarette device comprising a housing configured to hold a battery, a vent port arranged in the housing, and a safety valve means arranged on the vent port, wherein the safety valve means is configured to open and/or close the vent port partially and/or completely depending on the temperature within the housing.

As the valve opens automatically when the temperature of the battery exceeds a certain value, the potential danger of an explosion caused by an increase of pressure inside the housing from a malfunction of the battery can be reduced.

As batteries heat up before emitting gases, the valve opens even before pressure can build up inside the housing. Pressure-controlled valves, on the other hand, open only after a certain pressure has built up inside the housing, which can be dangerous, especially when the pressure builds up very quickly.

The safety valve means is preferably configured to close the vent port by taking a first shape during normal conditions (below a temperature threshold) and to open the vent port by taking a second shape when the temperature exceeds a threshold. A valve means that opens the vent port by changing its shape in case of a thermal event is a reliable, cost-efficient and easy to implement means of a temperature-controlled safety valve.

Preferably, the safety valve means is further configured to take back its first shape when the temperature falls below the threshold value so as to partially or completely close the vent port. It is advantageous that the valve means, after the thermal event has stopped and the battery has cooled down, can close the vent port again to prevent the user from being exposed to potentially toxic residues remaining in the housing.

The threshold temperature value lies preferably between 59° C. and 74° C. A threshold value in this temperature range has proven to reliably indicate a thermal event of the battery and to cause a transformation of the SMA in order to open the vent port.

It is further preferred that the safety valve means has a reaction time of less than 100 ms to fully open. A short reaction time of the valve means increases the safety of the electronic cigarette device since pressure can build up quickly inside the housing in case of a thermal event, which can be avoided if the safety valve opens quickly.

The safety valve means can further include at least an SMA element containing a shape memory alloy (SMA). SMAs are well suited as valve means in temperature-controlled safety valves since they are durable, reliable and relatively cost-efficient as well as available in a wide range of specifications.

The SMA element can further contain a blend of 45Ni-50Ti-5Cu. This particular type of SMA has proven to be exceptionally suitable for the intended application as its transformation temperature lies in the above-specified range that corresponds to the temperature caused by a thermal event.

The safety valve means can further include at least an elastic seal, preferably made of silicone. Such an elastic seal helps to avoid the intrusion of dust or humidity into the housing in the closed state of the valve and can be elastically deformed by the valve means in case of a thermal event.

The safety valve means can at least partially be configured to bend, straighten, contract, expand, harden, soften, melt or decompose when the temperature threshold is exceeded. All said transitions can cause the valve means to open the vent port in case of a temperature increase resulting from a thermal event and are relatively easy to implement.

The SMA element can have a circular or semi-circular shape, be attached to the elastic seal and configured to straighten partially when heated, thereby increasing the diameter of its circular or semi-circular shape, pushing the elastic seal radially apart and increasing the diameter of the valve opening.

This embodiment is particularly cost-efficient and easy to implement compared for instance to an arrangement featuring a safety valve means with two separate pieces.

The SMA element can have a curved shape, be attached to the elastic seal of a first piece of the safety valve means and configured to straighten partially when heated, thereby separating said first piece at least partially from a second piece of the safety valve means and creating and/or increasing a valve opening.

The SMA element can have a longitudinal shape and be configured to bend when heated, thereby partially lifting the safety valve means up from the vent port and creating and/or increasing a valve opening.

The SMA element can have a longitudinal shape, be attached to a first piece of the safety valve means and configured to contract when heated, thereby separating said first piece from a second piece of the safety valve means and creating and/or increasing a valve opening.

These embodiments allow the vent port to be sealed completely by the safety valve means in the closed state.

BRIEF DESCRIPTION OF THE DRAWINGS

Hereinafter, the invention will be described with reference to the drawings showing exemplary embodiments, in which.

DETAILED DESCRIPTION OF THE DRAWINGS

Figure 1:
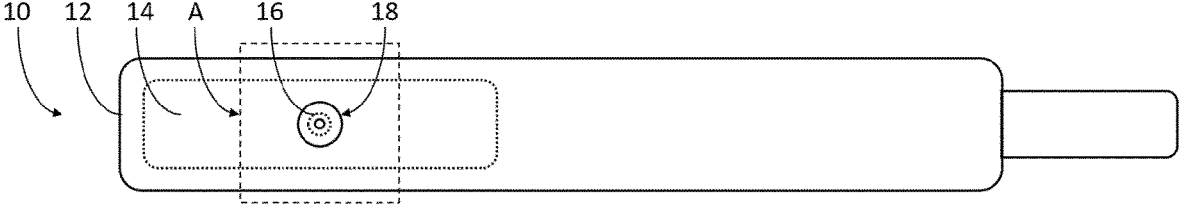
FIG. 1 shows a schematic top view of an e-cigarette device according to the invention.

The enclosed figures show preferred embodiments, which are to be understood as exemplary and not as limiting.

Features of the embodiments described below can also be used to further characterize the device defined in the claims.

Modifications of features can be combined to form further embodiments. Features described in individual embodiments can be provided in a single embodiment if they are not incompatible. Likewise, features described in a single embodiment can be provided in several embodiments individually or in any suitable sub-combination.

The same reference numerals listed in different figures refer to identical, corresponding or functionally similar elements.

FIG. 1 shows a schematic top view of an e-cigarette device 10 according to the invention. Inside the housing 12 is a battery 14 that provides the cartomizer (not shown) with energy to generate a vapor that is inhaled by the user. As the housing 12 is essentially hermetically sealed, the battery 14 is protected from external influences like dirt, dust or humidity.

The housing 12 further comprises a vent port 16 that is preferably located near the battery 14 to release pressure from the inside of the housing 12 in case of a thermal event, in which the battery 14 overheats and emits high-pressure gases.

The vent port 16 is covered by a temperature-activated valve means 18 that automatically opens the vent port 16 in case of a thermal event in order to release the pressure inside the housing 12 caused by said gases emitted from the battery 14. The valve means 18 can have different designs, which are exemplarily described in the following embodiments.

Figure 2A:
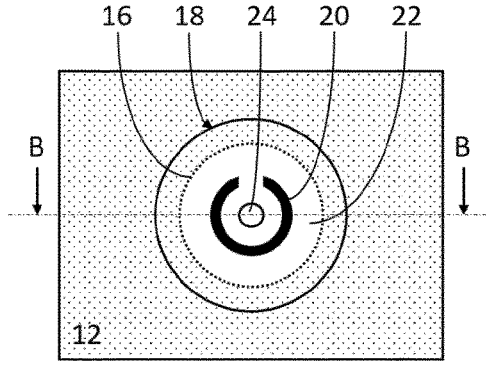
FIG. 2a shows an enlarged view of area "A" from FIG. 1 according to a first embodiment in a closed state.
Figure 2B:
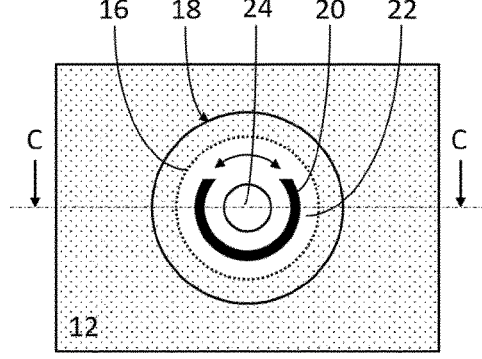
FIG. 2b shows an enlarged view of area "A" from FIG. 1 according to a first embodiment in an opened state.

FIGS. 2a and 2b show enlarged views of the area "A" from FIG. 1 according to a first embodiment of the invention in a closed and opened state, respectively. In this example, the vent port 16 is a circular hole in the housing 12, covered by a circular valve means 18. However, they are not limited to a circular shape. The valve means 18 consists of a semi-circular SMA element 20, which is attached to an elastic seal 22 covering the vent port 16 and having a small (valve) opening 24 in its center, which can be closed completely by additional means (not shown).

In a thermal event, the SMA element 20 opens up or straightens partially, thereby increasing the diameter of its semi-circular shape, pushing the silicon seal 22 radially apart and increasing the diameter of the valve opening 24.

Figure 3A:
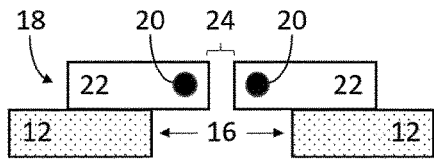
FIG. 3a shows a sectional view along line "B" from FIG. 2a according to a first embodiment in a closed state.
Figure 3B:
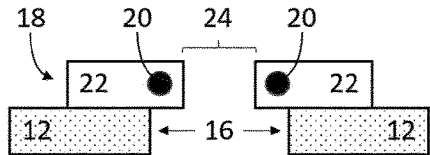
FIG. 3b shows a sectional view along line "C" from FIG. 2b according to a first embodiment in an opened state.

FIGS. 3a and 3b show sectional views along lines "B" and "C" from FIGS. 2a and 2b, respectively. The valve means 18, consisting of an SMA element 20 and an elastic seal 22, is arranged on the vent port 16 of the housing 12. When the SMA element 20 opens up, the valve opening 24 provided in the center of the elastic seal 22 opens up as well. As the vent port 16 is not entirely covered in the closed state in this embodiment, additional sealing elements such as a central pin covering the small valve opening 24 in the closed state may be provided.

Figure 4A:
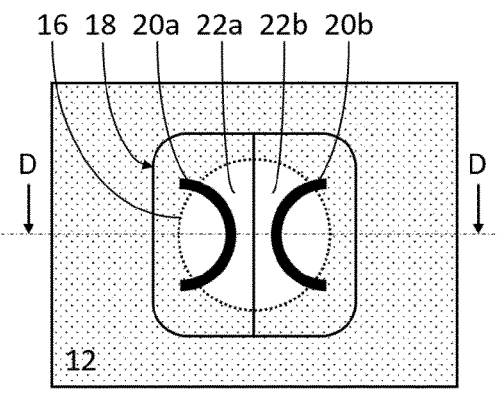
FIG. 4a shows an enlarged view of area "A" from FIG. 1 according to a second embodiment in a closed state.
Figure 4B:
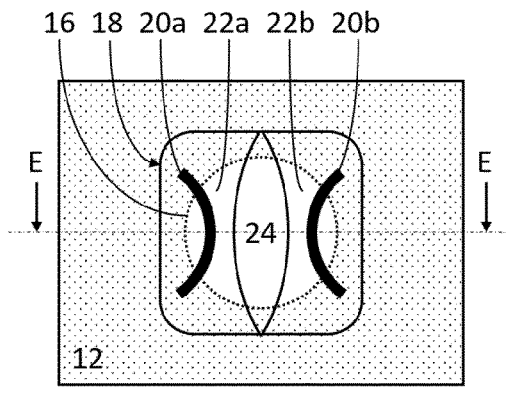
FIG. 4b shows an enlarged view of area "A" from FIG. 1 according to a second embodiment in an opened state.

FIGS. 4a and 4b show enlarged views of the area "A" from FIG. 1 according to a second embodiment of the invention in a closed and opened state, respectively. In this example, the vent port 16 is a circular hole in the housing 12, covered by an essentially rectangular valve means 18 consisting of two separate parts. Again, different shapes can be used as well. Both parts of the valve means 18 consist of semi-circular SMA elements 20a,20b and elastic seals 22a, 22b and abut in the center of the vent port 16, thereby covering it completely.

In a thermal event, the SMA elements 20a,20b open up or straighten partially, thereby pulling the abutting elastic seals 22a,22b apart and creating a gap or a valve opening 24 in between both parts of the valve means 18.

Figure 5A:
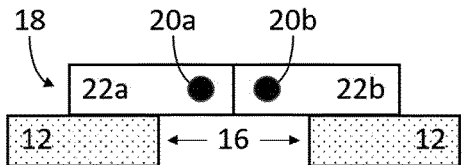
FIG. 5a shows a sectional view along line "D" from FIG. 4a according to a second embodiment in a closed state.
Figure 5B:
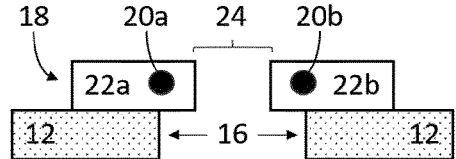
FIG. 5b shows a sectional view along line "E" from FIG. 4b according to a second embodiment in an opened state.

FIGS. 5a and 5b show sectional views along lines "D" and "E" from FIGS. 4a and 4b, respectively. Both parts of the valve means 18, each consisting of an SMA element 20a,20b and an elastic seal 22a,22b, are arranged on the vent port 16 of the housing 12. When the SMA elements 20a,20b straighten, a valve opening 24 is created in between both parts of the valve means 18. As the vent port 16 is entirely covered in the closed state in this embodiment, no additional sealing elements are required.

Figure 6A:
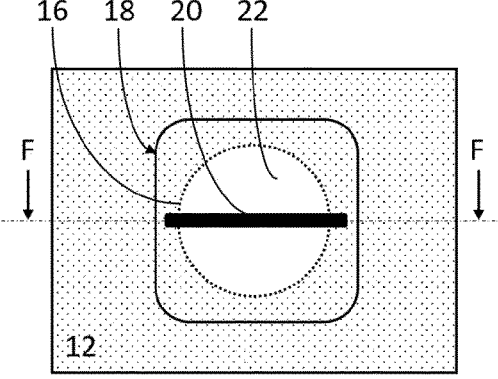
FIG. 6a shows an enlarged view of area "A" from FIG. 1 according to a third embodiment in a closed state.
Figure 6B:
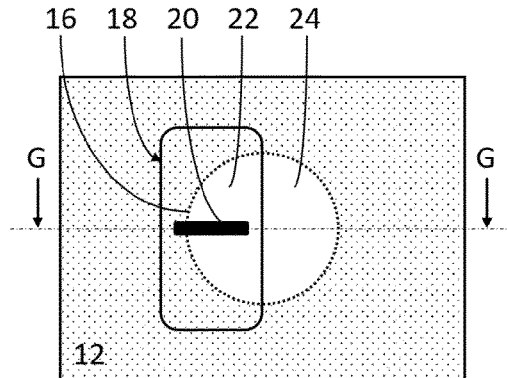
FIG. 6b shows an enlarged view of area "A" from FIG. 1 according to a third embodiment in an opened state.

FIGS. 6a and 6b show enlarged views of the area "A" from FIG. 1 according to a third embodiment of the invention in a closed and opened state, respectively. In this example, the vent port 16 is a circular hole in the housing 12, covered by an essentially rectangular valve means 18. Again, different shapes can be used as well. The valve means 18 comprises a straight or flat SMA element 20 attached to an elastic seal 22, covering the vent port 16 in the closed state.

In a thermal event, the SMA element 20 bends upwards, thereby lifting up the elastic seal 22 and creating a gap or a valve opening 24 between the vent port 16 and the valve means 18.

Figure 7A:
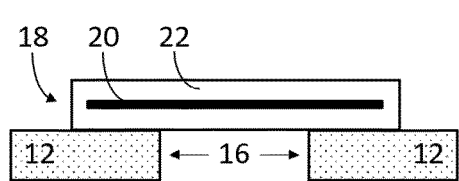
FIG. 7a shows a sectional view along line "F" from FIG. 6a according to a third embodiment in a closed state.
Figure 7B:
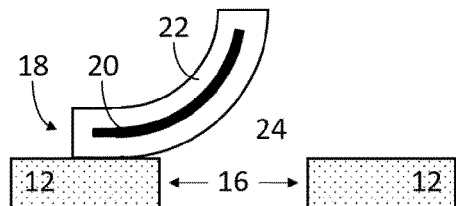
FIG. 7b shows a sectional view along line "G" from FIG. 6b according to a third embodiment in an opened state.

FIGS. 7a and 7b show sectional views along lines "F" and "G" from FIGS. 6a and 6b, respectively. The valve means 18, consisting of an SMA element 20 and an elastic seal 22, is arranged on the vent port 16 of the housing 12. When the SMA element 20 bends upwards, the elastic seal 22 is partially separated from the housing 12 and a valve opening 24 is created. As the vent port 16 is entirely covered in the closed state in this embodiment, no additional sealing elements are required.

Figure 8A:
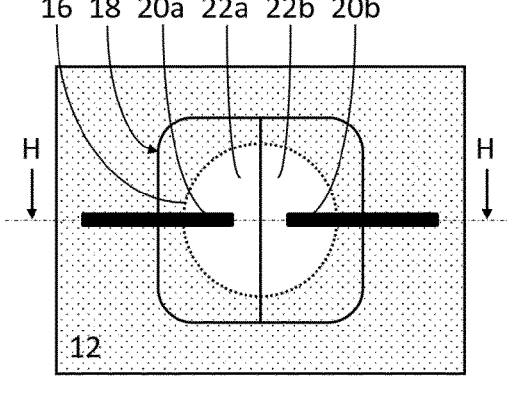
FIG. 8a shows an enlarged view of area "A" from FIG. 1 according to a fourth embodiment in a closed state.
Figure 8B:
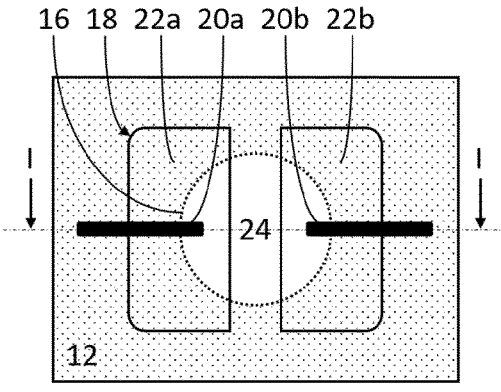
FIG. 8b shows an enlarged view of area "A" from FIG. 1 according to a fourth embodiment in an opened state.

FIGS. 8a and 8b show enlarged views of the area "A" from FIG. 1 according to a fourth embodiment of the invention in a closed and opened state, respectively. In this example, the vent port 16 is a circular hole in the housing 12, covered by an essentially rectangular valve means 18 consisting of two separate parts. Again, different shapes can be used as well. Both parts of the valve means 18 consist of straight SMA elements 20a,20b and elastic seals 22a,22b and abut in the center of the vent port 16, thereby covering it completely.

In a thermal event, the SMA elements 20a,20b contract, thereby pulling the abutting elastic seals 22a,22b apart and creating a gap or a valve opening 24 in between both parts of the valve means 18.

Figure 9A:
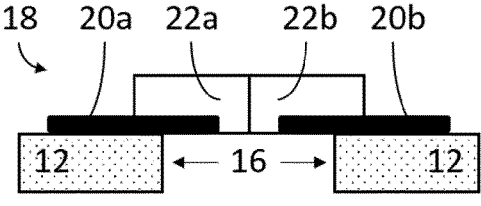
FIG. 9a shows a sectional view along line "H" from FIG. 8a according to a fourth embodiment in a closed state.
Figure 9B:
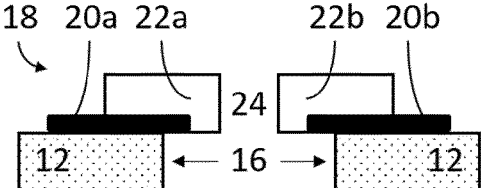
FIG. 9b shows a sectional view along line "I" from FIG. 8b according to a fourth embodiment in an opened state.

FIGS. 9a and 9b show sectional views along lines "H" and "I" from FIGS. 8a and 8b, respectively. Both parts of the valve means 18, each consisting of an SMA element 20a,20b and an elastic seal 22a,22b, are arranged on the vent port 16 of the housing 12. When the SMA elements 20a,20b contract, a valve opening 24 is created in between both parts of the valve means 18. As the vent port 16 is entirely covered in the closed state in this embodiment, no additional sealing elements are required.

It should be noted that the valve means 18 shown in the second and fourth embodiments do not necessarily have to be arranged symmetrically. It is for example also possible that only one side of the valve means 18 comprises an SMA element 20.

It should also be noted that it can further be advantageous if the valve means 18 does not seal the vent port 16 completely as long as the valve opening 24 is sufficiently small in the closed state. In this case for example, no additional sealing elements are provided in the first embodiment and both parts of the valve means 18 in the second and fourth embodiment are arranged with a gap in the closed state.

REFERENCE LIST 10 e-cigarette device
12 housing
14 battery
16 vent port
18 valve means
20,20a,20b SMA element
22,22a,22b elastic seal
24 valve opening

The invention claimed is:

1. An electronic cigarette device comprising:
a housing separate from and configured to hold a battery,
a vent port arranged on the housing, and
a safety valve arranged on the vent port,
wherein the safety valve is configured to open and/or close the vent port partially and/or completely depending on a temperature within the housing.

2. The electronic cigarette device according to claim 1, wherein the safety valve is configured to at least partially close the vent port by taking a first shape during normal conditions when the temperature is below a threshold value and to at least partially open the vent port by taking a second shape when the temperature exceeds said threshold value.

3. The electronic cigarette device according to claim 2, wherein the safety valve is configured to take back the first shape when the temperature falls below the threshold value so as to partially or completely close the vent port.

4. The electronic cigarette device according to claim 2, wherein the threshold value lies between 59° C. and 74° C.

5. The electronic cigarette device according to claim 1, wherein the safety valve has a reaction time of less than 100 ms to fully open.

6. The electronic cigarette device according to claim 1, wherein the safety valve includes at least a shape memory alloy element containing a shape memory alloy.

7. The electronic cigarette device according to claim 6, wherein the shape memory alloy element contains a blend of 45Ni-50Ti-5Cu.

8. The electronic cigarette device according to claim 6, wherein the safety valve includes at least an elastic seal.

9. The electronic cigarette device according to claim 2, wherein the safety valve is at least partially configured to bend, straighten, contract, expand, harden, soften, melt or decompose when the threshold value is exceeded.

10. The electronic cigarette device according to claim 8, wherein the shape memory alloy element has a circular or semi-circular shape and is attached to the elastic seal and configured to straighten partially when heated, thereby increasing a diameter of the circular or semi-circular shape, pushing the elastic seal radially apart and increasing a diameter of a valve opening.

11. The electronic cigarette device according to claim 8, wherein the shape memory alloy element has a curved shape and is attached to the elastic seal of a first piece of the safety valve and configured to straighten partially when heated, thereby separating said first piece at least partially from a second piece of the safety valve and creating and/or increasing a valve opening.

12. The electronic cigarette device according to claim 6, wherein the shape memory alloy element has a longitudinal shape and is configured to bend when heated, thereby partially lifting the safety valve up from the vent port and creating and/or increasing a valve opening.

13. The electronic cigarette device according to claim 6, wherein the shape memory alloy element has a longitudinal shape and is attached to a first piece of the safety valve and configured to contract when heated, thereby separating said first piece from a second piece of the safety valve and creating and/or increasing a valve opening.

14. The electronic cigarette device according to claim 8, wherein the elastic seal is made of silicone.

15. An electronic cigarette device comprising:

a housing configured to hold a battery and configured to be directly grasped by a user in use of the electronic cigarette device, a vent port arranged in the housing, and a safety valve arranged on the vent port, wherein the safety valve is configured to open and/or close the vent port partially and/or completely depending on a temperature within the housing.

16. The electronic cigarette device according to claim 15, wherein the safety valve is configured to at least partially close the vent port by taking a first shape during normal conditions when the temperature is below a threshold value and to at least partially open the vent port by taking a second shape when the temperature exceeds said threshold value.

17. The electronic cigarette device according to claim 16, wherein the safety valve is configured to take back the first shape when the temperature falls below the threshold value so as to partially or completely close the vent port.

18. The electronic cigarette device according to claim 15, wherein the safety valve includes at least a shape memory alloy element containing a shape memory alloy.

19. The electronic cigarette device according to claim 18, The electronic cigarette device according to claim 6, wherein the safety valve includes at least an elastic seal.

20. The electronic cigarette device according to claim 15, wherein the safety valve is at least partially configured to bend, straighten, contract, expand, harden, soften, melt or decompose when the threshold value is exceeded.

\* \* \* \* \*